UNITED STATES PATENT OFFICE.

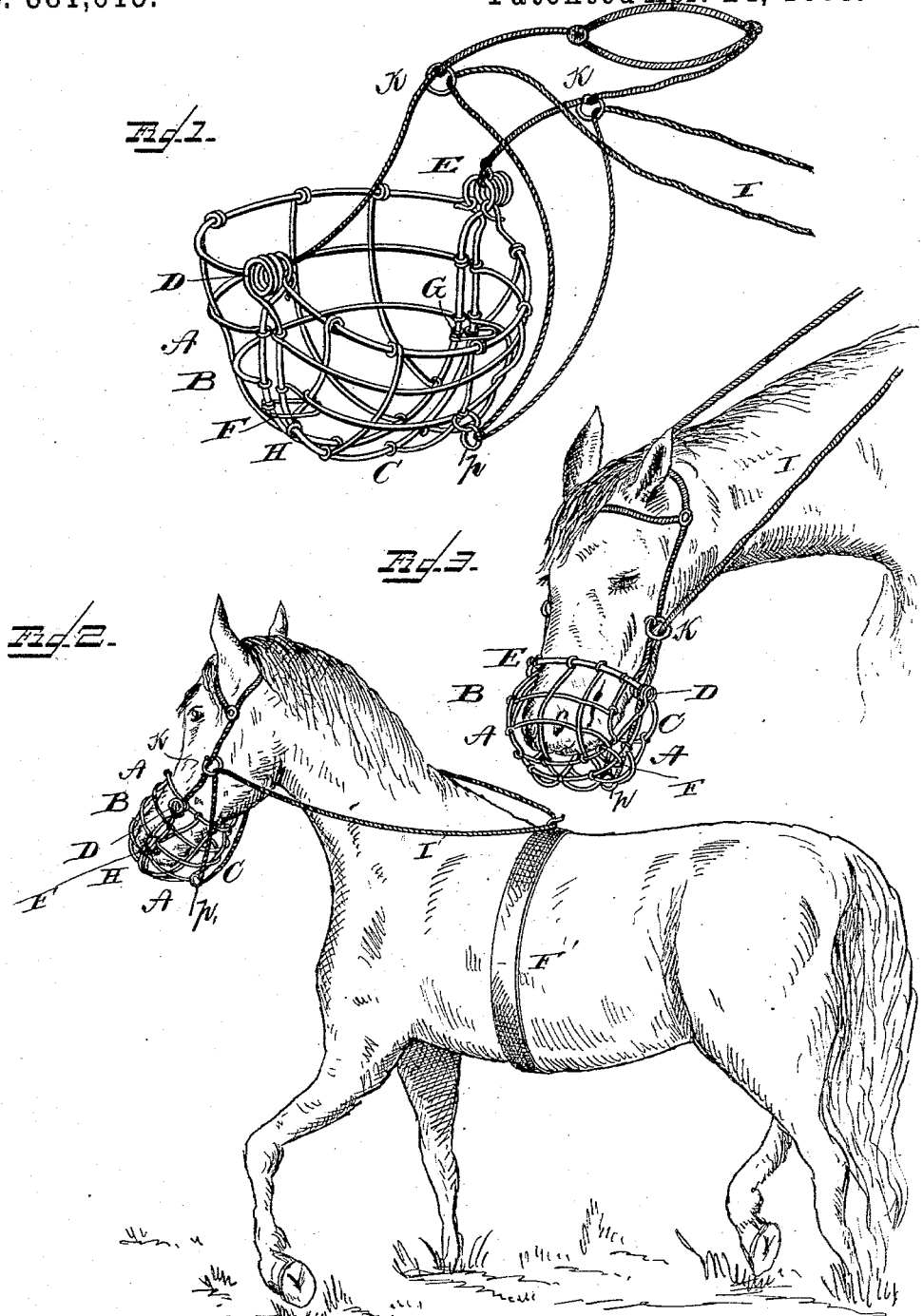

ROBERT B. COLE, OF PALMERSVILLE, TENNESSEE.

MUZZLE.

SPECIFICATION forming part of Letters Patent No. 381,615, dated April 24, 1888.

Application filed December 30, 1887. Serial No. 259,403. (No model.)

*To all whom it may concern:*

Be it known that I, ROBERT B. COLE, a citizen of the United States, residing at Palmersville, in the county of Weakley and State of Tennessee, have invented certain new and useful Improvements in Muzzles; and I do hereby declare the following to be a full, clear, and exact description of the invention, such as will enable others skilled in the art to which it appertains to make and use the same.

My invention relates to improvements in muzzles for horses, mules, sheep, and the like; and it consists in the construction and novel arrangement of parts, as hereinafter described and claimed.

In the accompanying drawings, Figure 1 is a view in perspective of an animal-muzzle embodying the improvements of my invention, the closed position being shown in full lines. Fig. 2 shows the device in position on a horse while at rest. Fig. 3 shows the animal provided with the muzzle and in the act of feeding.

The object of the invention is to control the horse and permit him to feed only on grass close to the ground, or at desired predetermined heights above the ground, and also to prevent the animal from biting off the tops of growing corn-plants while the animal is drawing the plow or cultivator through the field of plants.

Referring by letter to the drawings, A designates my improved muzzle, which is made of open woven wire-work and in two sections, B C, hinged together at their inner upper corners by coil-springs D E, made integral with the section B, and which tend normally to hold the two sections in the closed position. Loops F G project rearwardly from the front section, B, of the muzzle and encircle the marginal wire, H, of the rear section, C, and serve to limit the extent to which the muzzle can be opened by the animal. The muzzle A is suspended from the lower ends of the cheek-strap of the bridle, and the rear section, C, is connected with the surcingle F' by the reins I, which pass through loops or guides K, connected to the cheek-straps at or near the head-stall, so that when the animal lowers its head the reins, which pass through a ring, P, secured to section C, will draw upon the said hinged section C of the muzzle and open the same, thereby permitting the animal to graze or bite off the grass.

When the animal raises its head, the muzzle closes automatically and permits the animal to masticate the grass previously bitten off. By this arrangement no pressure on the muzzle is required, the simple effort of the animal in reaching for the grass causing the muzzle to open, it being necessary, however, that the animal should lower its head to operate the muzzle.

Having described my invention, what I claim, and desire to secure by Letters Patent, is—

1. In a muzzle, the combination, with the sections B C, hinged together at their upper inner corners by coiled springs D and E, formed integral with section B, of the loops F G, secured to section B and connected to section C, and the ring $p$, attached to said section C, substantially as shown and described, and for the purpose set forth.

2. The muzzle herein described, consisting of the sections B C, the coiled springs D E, connecting said sections at their upper inner corners and formed integral with section B, the controlling-loops F G, secured to section B and connected to section C, said section C having ring $p$, the cheek-straps provided with rings K, and the reins I, passing through rings K and ring $p$, and adapted to connect with the surcingle F', as and for the purpose specified.

In testimony whereof I affix my signature in presence of two witnesses.

ROBERT B. COLE.

Witnesses:
R. F. BOSTICK,
GEO. G. HUTCHISON.